W. SCHAAKE.
PANTOGRAPH TROLLEY.
APPLICATION FILED OCT. 16, 1918.
1,410,960.
Patented Mar. 28, 1922.
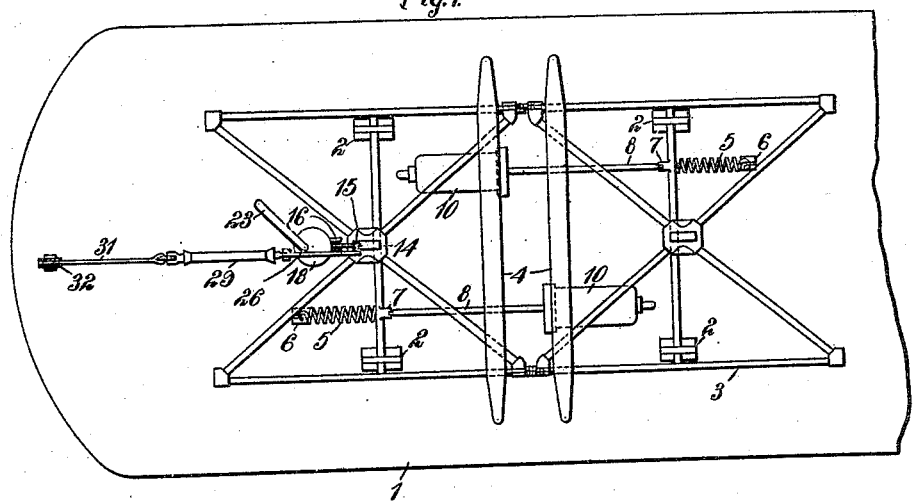
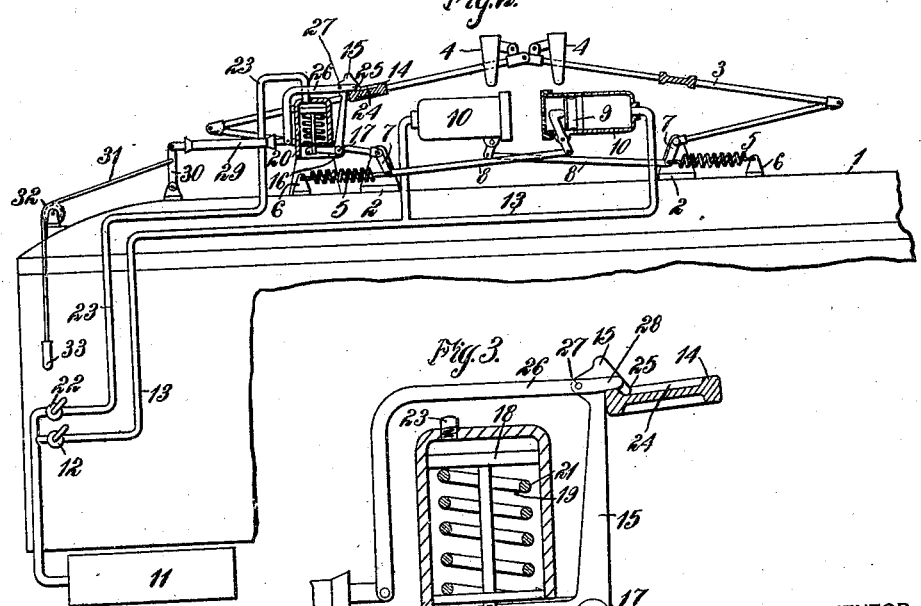
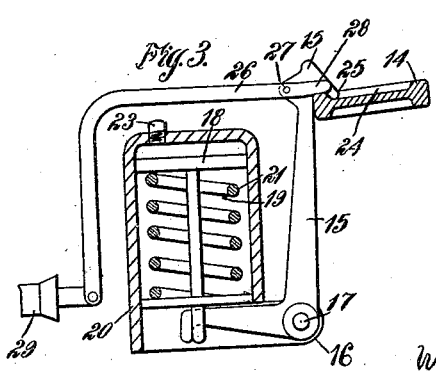
WITNESSES:
INVENTOR
William Schaake
BY
Wesley G. Carr
ATTORNEY

UNITED STATES PATENT OFFICE.

WILLIAM SCHAAKE, OF PITTSBURGH, PENNSYLVANIA, ASSIGNOR TO WESTINGHOUSE ELECTRIC & MANUFACTURING COMPANY, A CORPORATION OF PENNSYLVANIA.

PANTOGRAPH TROLLEY.

1,410,960.   Specification of Letters Patent.   Patented Mar. 28, 1922.

Application filed October 16, 1918. Serial No. 258,432.

*To all whom it may concern:*

Be it known that I, WILLIAM SCHAAKE, a citizen of the United States, and a resident of Pittsburgh, in the county of Allegheny and State of Pennsylvania, have invented a new and useful Improvement in Pantograph Trolleys, of which the following is a specification.

My invention relates to trolleys and particularly to latching devices for pantograph trolleys.

One object of my invention is to provide a device of the above-indicated character that, in a resiliently-opposed retracted position of an extensible pantograph trolley frame, shall be interlocked therewith to prevent accidental release by jarring and other causes.

Another object of my invention is to provide a trolley-latching device that shall require an initial operation, preparatory to release, for preventing the hasty or inadvertent engagement of the trolley with a trolley conductor.

Another object of my invention is to provide means for preventing a pantograph trolley from effecting violent engagement with a trolley conductor.

A further object of my invention is to provide a trolley-latching device that shall be rugged and durable in construction and effective in operation, and that shall facilitate its manipulation from the cab of or other position on a vehicle on which it may be mounted.

It is usual, in spring-extended pneumatically-retracted pantograph trolleys, to provide latching devices to hold the same in retracted positions.

Heretofore, certain of these devices have comprised co-operating members having uninterrupted latching faces that have permitted the release thereof by a single direct movement of one of the members, whereby the accidental release thereof by jarring or other causes has been possible.

Further, after a pneumatically-retracted trolley has remained in latched position for a sufficient length of time to permit the air in the retracting cylinder to escape, release of the latch has permitted the trolley to engage the trolley conductor with considerable violence.

In practicing my invention, I provide a pantograph trolley latch that is readily operable from the cab of a locomotive, that ensures against accidental release and which, by requiring the admission of air to the retracting cylinder in order that it may be released, prevents the violent engagement of the trolley with a trolley conductor.

Figure 1 of the accompanying drawings is a diagrammatic plan view of an electric locomotive on which a pantograph trolley embodying my invention is mounted; Fig. 2 is a side view, partially in elevation and partially in section, of the apparatus shown in Fig. 1; and Fig. 3 is an enlarged detail view, partially in elevation and partially in section, of my improved form of latching device, as viewed in Fig. 2.

A locomotive or other vehicle 1 pivotally supports, by means of brackets 2 or other suitable means, an extensible pantograph frame 3 of usual construction, which, in turn, supports contact members 4 for engagement with a trolley conductor (not shown). The frame 3 may be moved to its extended position and held in that position by springs 5 extending between stationary brackets 6 disposed on the locomotive 1 and arms 7 rigidly related to the frame 3, and may be retracted to the position shown in the drawings by co-operating links 8 and pistons 9 disposed in cylinders 10 that may receive a supply of air from a reservoir 11 through an actuating valve 12 and a conduit 13.

A member 14 is attached to the upper part of the frame 3 to be engaged by a bell-crank latching pawl 15 when the frame is in its retracted and inactive position. The pawl 15 is pivotally mounted upon a bracket 16 by means of a pin 17 and its shorter arm is operatively connected to a piston 18 by a rod 19. The piston 18 is fitted within a cylinder 20 to be operated by compressed air to withdraw the pawl from its latching position and is normally held in its latching position by a spring 21. Air is supplied to the cylinder 20 from the reservoir 11 through an actuating valve 22 and a conduit 23.

As more clearly shown in Fig. 3, the member 14 is provided with a recess 24 to receive an overhanging or hook portion 25 of the pawl 15. Being thus interlocked, a direct withdrawal of the pawl 15 from the member 14 is prevented.

In order to effect release of the pawl 15 from the member 14, it is necessary to depress the latter sufficiently to permit the portion 25 to pass over the shoulder at the end of the recess 24. To depress the member 14, the actuating valve 12 may be operated to admit air to the retracting cylinders 10 after which, by actuation of the valve 22, air will be admitted to the cylinder 20 to retract the pawl 15.

The air which is admitted to the cylinders 10 to depress the member 14 and thus release the pawl 15 serves to oppose the force exerted by the springs 5 sufficiently to prevent violent engagement of the members 4 with the trolley conductor.

A lever 26 is pivoted, by a pin 27, to the pawl 15, and has a portion 28 that engages the member 14 adjacent the hook portion of the pawl and is connected, by an insulating connecting member 29, a pivoted supporting link 30, a flexible member 31, and a pulley 32 to an operating handle 33 in the cab of the vehicle. By actuating the handle 33 downwardly, the lever 26 will be rotatively moved clockwise about the pin 27, whereby the portion 28 will first depress the member 14, and the pawl will then be withdrawn from its latching position.

While I have shown and described a particular form of my invention, changes may be effected therein without departing from the spirit and scope thereof, as set forth in the appended claims.

I claim as my invention:

1. In a pantograph trolley, the combination with an extensible pantograph frame biased in one direction, of means for holding the frame in a retracted position, said means comprising a latching member movable in a direction transversely of the path of movement of the frame and having a hook and a member on said frame having a shoulder adapted to engage the said hook, whereby the hook is prevented from moving to unlatched position until after the frame has been further retracted.

2. In a trolley, the combination with a contact member and a movable supporting member therefor normally yieldingly maintained in one position, of means for holding the supporting member against advancing toward said position comprising a latching member having a hook portion adapted to engage a shoulder on the supporting member, to prevent release movement of the latching member until after the said supporting member has been further retracted.

3. A trolley latching device comprising a movable latching member, a co-operating movable member adapted to be restrained in a predetermined position by the latching member, said members being provided with interlocking portions so formed as to prevent unlocking movement by the latching member, to permit the said movable member to advance, until after the said movable member has been further retracted.

4. A trolley comprising a pantograph frame biased toward its expanded position, means for retracting the frame, latching means for retaining the frame in retracted position and interlocked therewith to prevent accidental release, and manually operable means whereby the frame may be further retracted to permit release movement of the latch.

5. A trolley comprising a pantograph frame biased toward its expanded position, means for retracting the frame, latching means for retaining the frame in retracted position and interlocked therewith to prevent accidental release, and manually operable means connected to the latching means for further retracting the frame and for moving the latching means out of engagement therewith.

6. A trolley-latching device comprising a pivoted latching member and a movable member in engagement therewith, said members having interfitting portions to prevent accidental movement of the latching member, and manually operable means associated with said latching member for initially moving said movable member to permit release of the same by the latching member.

7. In a trolley, the combination with a contact member, an extensible supporting member therefor and pneumatic means, comprising a cylinder and a piston, connected to the supporting member for retracting the same, of means serving to prevent the contact member from effecting violent engagement with a trolley conductor, said means comprising a latching member interlocked with the supporting member in a retracted position of the latter to require further retraction of the supporting member to effect a release of the latching member, the air admitted to the cylinder to effect said further retraction retarding the supporting member during its extension movement.

8. In a trolley, the combination with a contact member, an extensible supporting member therefor, and means, comprising a cylinder and a piston, connected to the supporting member for retracting the same by fluid pressure, of means serving to prevent the contact member from effecting violent engagement with a trolley conductor, said means comprising a latching member interlocked with said supporting member in a retracted position of the latter to require moving the supporting member to permit the release of the latching member, the change in the fluid pressure in said cylinder to effect said movement of said supporting member serving to retard the supporting member during its extension movement.

9. In a trolley, the combination with a contact member, an extensible carrying member therefor, resilient means for extending said carrying member and a cylinder having a piston connected to the carrying member and to said resilient means, of means ensuring a predetermined fluid pressure at one side of said piston to prevent violent engagement of the contact member with a trolley conductor, said means comprising a member engaging said carrying member to restrain it in a retracted position and normally releasable therefrom only when a change occurs in the pressure at one side of said piston.

10. A trolley-latching device comprising a longitudinal member having a portion of hook-shape at one end and pivoted at its other end, a movable member having a portion of hook-shape oppositely related to the hook portion of the longitudinal member and biased toward the same for interlocking engagement therewith, and a pivoted member having an arm projecting over the hook portion of said movable member to disengage the same from the hook portion of the longitudinal member, whereupon said longitudinal member and said movable member may be separated.

11. A trolley comprising a pantograph frame normally biased to one normally extreme position, means for retracting the frame to its other normally extreme position, and means for preventing movement of the frame to its first named position until after it has been retracted to a point beyond its second named position.

In testimony whereof, I have hereunto subscribed my name this 30th day of Sept., 1918.

WILLIAM SCHAAKE.